United States Patent Office 3,376,136

Patented Apr. 2, 1968

3,376,136

PHOTOGRAPHIC ELEMENTS AND PROCESSES

Sigrid Seide, New Brunswick, N.J., assignor to E. I. du Pont de Nemours and Company, Wilmington, Del., a corporation of Delaware No Drawing. Filed Jan. 27, 1964, Ser. No. 340,491
12 Claims. (Cl. 96—28)

ABSTRACT OF THE DISCLOSURE

Photopolymerizable elements comprising a support bearing a thermoplastic photopolymerizable stratum containing (a) a thermoplastic organic compound solid at 50° C., (b) an ethylenically unsaturated compound containing at least one terminal ethylenic group, (c) an addition polymerization initiator and (d) a polymeric dye absorbing actinic radiation in a portion of the visible spectrum and not absorbing appreciable radiation where the initiator is activatable, and image transfer processes using said elements (which have been exposed).

This invention relates to an image reproduction process for transferring images from photopolymerized image-bearing elements to a new receptor surface. Still more particularly, it relates to a dry thermal process for transferring such images. The invention also relates to new and improved photopolymerizable elements for use in dry thermal processes for transferring images.

Various processes for producing copies of an image embodying thermal transfer are known. In one of the commercially promising processes, the thermal transfer is accomplished in a wet system or one where water-yielding systems are present in addition to light-sensitive materials. In assignee's Burg and Cohen U.S. Patents 3,060,023, 3,060,024, 3,060,025 and Heiart U.S. Patent 3,060,026, dry processes are described for forming images through photopolymerization. The processes comprise thermal transfer steps in transferring to a receptive surface thermoplastic photographic images from a stratum on a support, said stratum being solid below 40° C., and containing:

(1) Image areas (underexposed) which are thermally transferable by having a stick or transfer temperature above 40° C. and below 220° C., comprising (a) A thermoplastic organic polymer, and (b) An ethylenically unsaturated compound, preferably containing at least one terminal ethylenic group, having a boiling point above 100° C. at atmospheric pressure, being capable of forming a high polymer by photoinitiated addition polymerization and having plasticizing action on said thermoplastic polymeric compound; said constituents (a) and (b) being present in amounts from 3 to 97 and 97 to 3 parts by weight, respectively, and (2) Complementary adjoining coplanar image areas (i.e., exposed reverse image areas) solid at 50° C. and comprising an addition polymer of the aforesaid monomer and said thermoplastic polymeric compound. Said stratum preferably also contains (c) An addition polymerization initiator activatable by light and thermally inactive below 185° C. in an amount from 0.001 to 10.0 parts by weight per 100 parts by weight of components (a) and (b), and, if desired, (d) An addition polymerization inhibitor in an amount from 0.001 part to 2.0 parts by weight per 100 parts by weight of the components (a) and (b) and, in order to form a visible image, and/or (e) A colorant or, for instance, a color-forming compound, e.g., a color former capable of forming an azomethine or a quinoneimine dye. Preferably the photopolymerizable stratum also bears at least one protective cover stratum of a wax as described in assignee's Burg U.S. Ser. No. 234,214, filed Oct. 30, 1962, now U.S. Patent 3,203,805 or a cover sheet as disclosed in Heiart U.S. 3,060,026. The dyes suggested in the above patents are of the monomolecular type as distinguished from polymeric dyes.

The processes for copying or transferring an image of the foregoing patents, however, have some disadvantages. For example, it has been observed that the monomolecular dye in the exposed areas tends to transfer to the receptive sheet during transfer of the unexposed non-polymerized image areas. This decreases the contrast of the desired image by virtue of the fact that the background also becomes stained. It is believed that dye transfers from the exposed areas because it is exuded from the polymer image in these areas even though the polymer image and filler in such areas do not transfer. This also holds true for finely ground pigments. The use of pigments as colorants, however, is objectionable for a number of other reasons. Long milling and dispersing times are required to obtain satisfactory mixtures of binder, monomer and pigment.

An object of this invention is to provide new and improved elements for carrying out the general process of image reproduction as disclosed in the above Burg and Cohen patents. A further object is to provide improved elements in which the colorants do not exude from the polymerized areas of the photopolymerizable layer. A still further object is to provide a dry process of image reproduction which provides images virtually free of background stain thus giving copies having higher contrast and better quality than the prior art processes. A still further object is to provide an element for a dry process of image reproduction containing a colorant which allows a high transmission of actinic light for the activation of a free radical generating addition polymerization initiator.

The above objects are accomplished by carrying out the processes described above with photopolymerizable elements as defined in Burg and Cohen U.S.P. 3,060,023 and in Burg U.S. application Ser. No. 234,214 filed Oct. 30, 1962, modified by using as the colorant or color-yielding compound, component (e), a polymeric dye in an amount from 0.5 to 70 parts by weight per 100 parts by weight of components (a) and (b). The polymeric dyes, having a molecular weight of at least 10,000 can be made by reacting certain monomolecular dyes with polymers having in recurring units of the polymer reactive groups, e.g., —OH, —$NH_2$, and >NH. The monomolecular dyes may be represented by the formula: F —Y where F is a dye moiety containing light-absorbing units and preferably having an extinction coefficient, $\epsilon$, greater than 1000. The polymeric dyes absorb actinic radiation in a portion of the visible spectrum but do not absorb appreciable radiation in another region where said initiator is activatable. The polymeric dye must be light-fast. The dye should also be free of groups which will react readily with Y. Y represents a group that will react with the recurring reactive group of the polymer to form a polymeric ester, ether, amine or amide, e.g., the groups: $—SO_2F$, $—SO_2Cl$, —COCl, $—SO_2—CH{=}CH_2$, $—SO_2—CH_2—CH_2—X$ $—NHCOCH_2CH_2Cl$,

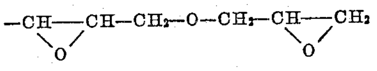

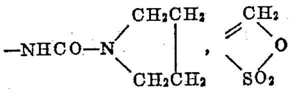

—N=CO, and —N=CS, as well as

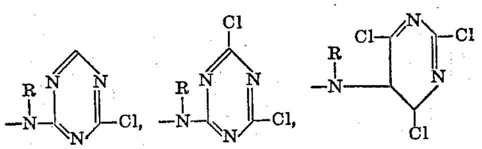

R is hydrogen or low molecular weight hydrocarbon, and X is a negative acid radical, e.g., Cl or Br, said groups being reactive with the above polymers. The dyes may contain other substituents for solubilization and other purposes as long as they are not readily reactive with the groups represented by Y.

A sub-genus of the polymeric dyes useful in the invention may be illustrated by the reaction between the polymer, polyethyleneimine and a dye represented by the general formula:

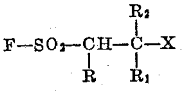

where F, X and R have the same meanings as above and $R_1$ and $R_2$ may also be hydrogen or alkyl of 1–4 carbons, e.g., methyl, ethyl, propyl and butyl. The dye moiety F may, for example, have the structure:

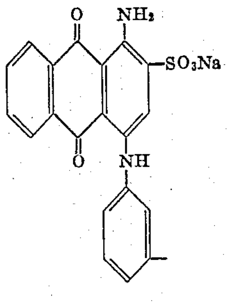

or

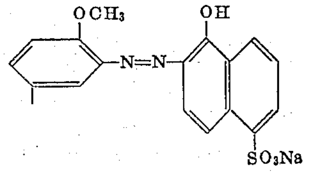

or

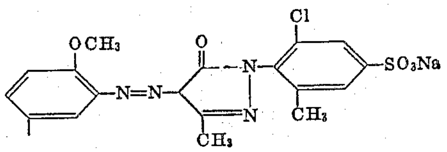

These and similar dyes are disclosed in Angevandte Chemie, 73, No. 4, pages 125–36 (1961) and Heyna et al., U.S. 2,657,205 dated Oct. 23, 1953. Dyes having the following general formula:

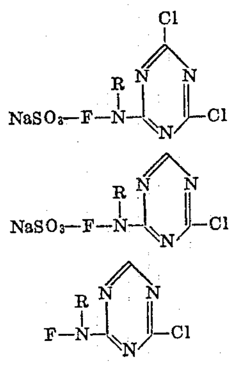

where F and R have the same meanings as assigned above. Dyes having the above or similar groups are sold under the tradenames "Cibacron" by Ciba; "Drimarene" by Sandoz, "Reactone" by Geigy, and "Procion," "Procion H" and "Procinyl" by the Imperial Chemical Industries, Ltd. The polymeric dyes may be used either singly or in combinations.

Other polymers which are useful in forming polymeric dyes are: cellulose acetate, cellulose acetate butyrate, methyl cellulose, ethyl cellulose, hydroxyethylcellulose and its partial ethers, esters and acetals; all containing a free —OH group in recurring units, and water-soluble polyamides, e.g., N-hydroxymethyl polymethylene adipamides, etc. Other polymeric dyes may also be used, e.g., polymers obtained by polymerizing monomers having attached thereto, dye nuclei of the above defined type to form polyacrylates, polymethacrylates, and polyacrylamides. Suitable addition polymers of the latter type being described in British Patent 877,402; and Firestine, U.S. Patent 3,073,699 and Melliand, Textilberichte, 43, 850–3 (1962).

The thermal transfer process comprises pressing the surface of an exposed element containing the photopolymerizable layer having incorporated therein a polymeric dye as described above and containing a thermoplastic photographic image in contact with the image-receptive surface of a separate element, heating at least one of said elements to a temperature of at least 40° C., and separating the two elements whereby the thermally transferable under-exposed dye-containing image areas of said stratum transfer to said image-receptive element and the overexposed dye-containing polymerized areas do not transfer or stain the background areas of the image-receptive element.

The term "underexposed" as used herein is intended to cover the image areas which are completely unexposed or partially exposed so that there is a material amount of the addition polymerizable compound still present and insufficient addition polymer image has been formed to bind the constituents so that the image areas do not melt and become transferred to the image-receptive element. The term, "transfer temperature" means the temperature at which the image areas in question stick and adhere, within 10 seconds, under slight pressure, e.g., thumb pressure, to analytical filter paper (Schleicher and Schuell analytical filter paper #595).

In general, in the process, components (a) and (b) of the photopolymerizable composition are present in amounts from 3 parts to 97 parts and 97 parts to 3 parts by weight, respectively, based on the weight of polymer and monomer. Also, the compositions are such that they do not melt at temperatures below 40° C.

The foregoing thermoplastic image-bearing elements can be made by exposing to actinic light, imagewise, a layer having the constitution defined above for thermally transferable image areas of item (1) above until sufficient addition polymerization takes place in the exposed areas to raise the transfer temperature at least 10° C. above that of the unexposed areas. The exposure can be through a stencil, line or halftone negative or positive, a cutout stencil in contact with the layer or by reflectographic or projection exposure.

An improvement over the element of Burg and Cohen U.S. 3,060,023 is disclosed in Burg, U.S. Ser. No. 234,214 (U.S.P. 3,203,805) cited above. The improvement comprises the image bearing element of the patent bearing a cover stratum comprising at least one wax in an amount of at least 15% by weight the cover stratum being characterized by having a melting point of at least 40° C., e.g., up to 150° C., having a low permeability to oxygen and being capable of transmitting actinic radiation. Said wax cover stratum is thermally transferable at or above its melting point. Preferably the wax cover stratum is also essentially colorless and is present in a dry thickness of up to 0.004 inch. Waxes useful for the cover stratum include animal, vegetable and mineral waxes and in addition the various natural and synthetic waxes disclosed in Bennetts, Commercial Waxes, Chemical Publishing Co., New York (1956) which meet the required criteria of the cover stratum set forth above. Preferred wax compositions include a mixture of synthetic ozokerite wax and a very high molecular weight synthetic normal paraffin wax; (made by the Fischer-Tropsch Process, described in Kirk and Othmer, "Encyclopedia of Chemical Technology," vol. 6. The Interscience Encyclopedia, Inc., New York, 1951, pages 964 and 978–980) and a modified ozokerite wax having predominantly branched-chain molecules and melting at 65 to 68° C. with the above identified synthetic normal paraffin wax of very high molecular weight. These improved elements, when modified by addition of the polymeric dye to, or by substituting such a dye for a monomeric colorant, in the photopolymerizable layer, are useful in accordance with this invention.

In using waxes it may be desirable to employ appropriate surface active agents to insure a uniform application of the wax cover stratum in the manner described in the above Burg application so long as the surface active agents are compatible with the polymeric dyes incorporated in the photopolymerizable system.

While the addition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck, U.S. 2,760,863, the particularly useful compounds fall within a general class, namely normally non-gaseous (i.e., at 20° C. and atmospheric pressure) ethylenically unsaturated monomeric compounds having one to five terminal ethylenic groups, preferably at least two, a molecular weight of not more than 2000, a normal boiling point above 100° C. and a plasticizing action on the thermoplastic layer.

In practicing the invention, a photopolymerizable element containing a polymeric dye as described above and containing an image-yielding stratum of the above components and, optionally, a wax cover layer is exposed to actinic radiation through a photographic process transparency, e.g., a photographic positive, negative, twotone or halftone, a light-transmitting paper, or to an image or printed matter on an opaque support by means of reflex exposure, and is intimately brought into contact under pressure with a receptor support, e.g., paper, metal, synthetic polymer, screen, etc., during which time the element is heated in the range of 40° to 220° C. or more, and while still warm the surfaces are separated. The thermoplastic photopolymerizable composition is transferred, to paper, metal, etc., support in the areas corresponding to the unexposed, or least exposed areas to give at least one duplicate copy of the original positive, negative or original image. Multiple copies can be obtained by repeating the heat transfer procedure using appropriate coating thickness of the photosensitive layer, pressures and temperatures to give the desired number of copies. The process can be used to prepare a silk screen. In the silk screen embodiment the thickness of the layer will depend on the nature of the screen, e.g., a coarser screen requires a heavier coating.

Relief images ranging in depth from a fraction of a mil up to 1 mil or more can be formed by the instant process, but unlike the processes described in Plambeck U.S.P. 2,760,863 a relief image is formed by thermal transfer of the unexposed areas of the photopolymerizable stratum and not by the solvent washout of said unexposed areas.

Prior to the transfer of a portion of the photopolymerizable layer (in underexposed areas), the layer is exposed to actinic radiation. This may be through a two-tone image or a process transparency, e.g., a process negative or positive (an image-bearing transparency consisting solely of substantially opaque and substantially transparent areas where the opaque areas are substantially of the same optical density, the so-called line or halftone negative or positive). The image or transparency may or may not be in operative contact, e.g., contact exposure or projection exposure. It is possible to expose through paper or other light transmitting materials. A stronger light source or longer exposure times must be used, however.

Reflex exposure techniques are especially useful in the present invention, particularly when office copies are made. By using reflex exposure, copies can be made from opaque supports, e.g., paper, cardboard, metal, etc., as well as from poor light transmitting surfaces with no loss in speed, excellent resolution, and in addition, right reading copies are obtained directly on transfer. Also the copies obtained are free of background stain.

Since free-radical generating addition-polymerization initiators depend on light for their activation, it is possible to use a wide range of light sources. Such sources include carbon arcs, mercury-vapor arcs, fluorescent lamps, argon glow lamps, electronic flash units and photographic flood lamps. Of these, the mercury-vapor arcs, particularly the sunlamp type, the fluorescent sunlamps, are most suitable.

After the exposure of the photopolymerizable layer, the exposed composition is contacted with the receptor support while simultaneously heat is applied to effect the transfer of the underexposed areas of the photopolymerizable composition. While the heat is preferably applied simultaneously with the contact of the exposed element to the receptor support, the heat can be applied at any stage of the process prior to the separation step to either or both elements provided the transfer temperatures correspond to at least the softening temperature of the photopolymerizable stratum. Heat can be applied by means well known to the art, e.g., rollers, flat or curved heating surfaces or platens, radiant sources, e.g., heating lamps, etc.

The heating temperature can range from above 40° C. to about 220° C. and the contact time for 0.1 to 10 seconds. In general about 0.1 second is adequate and shorter periods of contact are possible by using an intense radiant source of heat, e.g., infrared lamps or heat sources. Preferably the temperature range is 55° C. to 120° C.

The invention will be further illustrated by, but is not intended to be limited to the following detailed examples.

Example I

A polymeric dye was prepared by refluxing 25 grams of anhydrous polyethyleneimine and 25 grams of the blue dye [C.I. Acid Blue 215—Color Index Supplement].

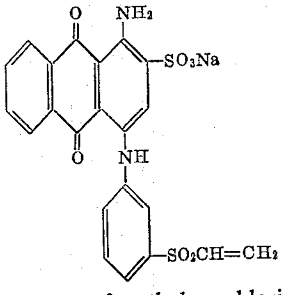

dissolved in 800 grams of methylene chloride for 3 hours. The polymeric dye precipitated and 30 grams of the polymeric dye was dissolved in 500 grams of ethylene glycol monomethyl ether, 440 grams of ethyl alcohol and 30 grams of glacial acetic acid. The resulting solution was centrifuged and filtered to remove undissolved material from the resulting polymeric amine.

The resulting dye solution was incorporated in a thermoplastic, photopolymerizable composition as follows:

To 450 grams of a methylene chloride solution containing 45 grams of cellulose acetate butyrate (ca. 20.5 acetyl, ca. 26% butyryl groups and having a viscosity of 56 to 131 poises as determined by ASTM method D–1343–54T in the solution described in Formula A, ASTM Method D–871–54T) there was added 234 grams of pentaerythritol triacrylate, 67 grams of a 10% methyl alcohol solution of polyethylene oxide having an average molecular weight of 4000 ("Carbowax 4000" made by the Carbide and Chemicals Company), 3.0 grams of phenanthrenequinone, and the above dye solution. The resulting solution was brought up to 2000 grams by the addition of methylene chloride and extrusion coated on 0.5 mil polyethylene terephthalate film to a dry layer thickness of 0.4 mil. The resulting thermoplastic photopolymerizable stratum was overcoated with an oxygen barrier stratum of wax to a coating thickness of 0.1 mil. The wax comprised a melted blend of 59 parts by weight of a fully refined paraffin wax of melting point 65–68° C., 40 parts of a wax made by the Fischer-Tropsch process (described in R. E. Kirk and D. F. Othmer, "Encyclopedia of Chemical Technology" described above), having a melting point of about 100° and 1 part of carnauba wax having a melting point of 82.5–86° C.

The resulting dried coating was exposed by reflex exposure and the non-photopolymerized image transferred in the manner disclosed in Example IV of the above Burg application. A clear sharp image was obtained with no evidence of background stain. An exposure to a carbon arc source through a stepped density wedge confirmed the low stain level and absence of low contrast toe region. The element showed a maximum reflection density of 0.33 as determined by a model RA–1100G Densitometer with an Eastman "Status A" yellow visual filter manufactured by the Westrex Corporation.

Example II

Two grams of a 33% aqueous solution of the reaction product of polyethylene glycol dichloride having a molecular weight of about 600 and diethylene triamine (as described in Example 1 of Belgium Patent 554,506) and one gram of the monomolecular dye shown in Example I above were heated in a round bottom flask for one hour on a steam bath. Then 5 g. of ethylene glycol monomethyl ether, 10 g. of methylene chloride and 0.5 g. of glacial acetic acid were added to the reaction mixture. The resulting solution was stirred well and filtered to remove impurities. The filtrate containing the polymeric amine dye was brought up to a total of 50 g. with methylene chloride.

A photopolymerizable composition was prepared by mixing 3.8 grams of pentaerythritol triacrylate, 0.8 gram of cellulose acetate butyrate (containing ca. 26% butyryl groups, ca. 20.5% acetyl groups and having a viscosity of 56–131 poises as determined by ASTM method D–1343–54T in the solution described in Formula A, ASTM method D–871–54T), 0.5 gram cellulose acetate (containing 39.4% acetyl groups and having a viscosity of 45), 0.04 gram of phenanthrenequinone, 10 grams of the polymeric dye solution and 3.5 grams of methylene chloride.

The resulting solution was coated on one mil polyethylene trephthalate film support to a thickness when dry of 0.4 mil. After drying for about 30 minutes, a cover film of one mil polyethylene terephthalate was pressure laminated to the surface of the photopolymerizable stratum in the manner taught by assignee's Heiart, U.S. Patent 3,060,026.

The resulting element was given a one second reflex exposure to a 29 $\sqrt[3]{2}$ step wedge to light from a 140 ampere, 5000 watt carbon arc lamp set at a distance of about 16 inches from the test sample. The cover film was then stripped from the laminated coating.

Transfer of the image of the step wedge was made by laying a sheet of bond paper on the coating and passing the superposed elements through pressure rollers at 130° C. and 2½ pounds of force per lineal inch of the rollers. The paper was separated from the film as it emerged from the rollers. A clear, sharp positive image was produced which showed little or no background stain in the overexposed areas. The image had a maximum density of 0.78.

When the above element was overcoated with a wax as described in Example I instead of being laminated to a cover sheet as described above similar results were obtained.

Example III

A polymeric dye was made by mixing with vigorous agitation 200 grams of a 6% acetone solution of cellulose acetate (acetyl range 48–49.5%) and 250 ml. of an aqueous solution containing 25 grams of sodium sulfate and 1 gram of the monomolecular blue dye having the formula:

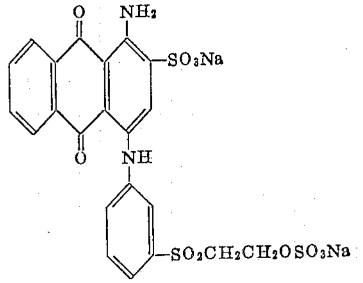

The mixture was heated to 100° C. for a period sufficient to drive off the acetone. The mixture was then cooled to 50° C. and there was added 6.25 grams of tribasic sodium phosphate, $Na_3PO_4 \cdot 12H_2O$. The reaction mixture was heated to 90° C. with stirring for a period of 30 minutes during which time a blue precipitate was formed. The mixture was filtered and washed several times with distilled water, the last washings being carried out with boiling distilled water. The washed precipitate was dried in a vacuum oven for 48 hours to give a dried weight of 10.6 grams of a polymeric dye ether.

A photopolymerizable composition was made by mixing together 2.8 grams of pentaerythritol triacrylate, 1.1 grams of a 10% methyl alcohol solution of polyethylene oxide (as described in Example I), 4 grams of methyl alcohol, 12.0 grams of a 5.6% acetone solution of cellulose acetate butyrate (ca. 21% acetyl, ca. 26% butyryl groups and having a viscosity of 9–13.5 poises as determined by ASTM method D–1343–54T in solution described in Formula A, ASTM method D–871–54T), 0.55 gram of the above polymeric dye, 0.04 gram of phenanthrenequinone and 20 grams of acetone. The resulting mixture was ball-milled for one hour and then coated onto a 1-mil polyethylene terephthalate film, to give a dry coating thickness of 0.3 mil. A laminated cover sheet as described in Example II was pressure laminated onto the surface of the photopolymerizable layer.

The resulting element was exposed and transferred after stripping off the cover sheet as described in Example I. The photographic speed of the material was good as was the transfer of the imagewise unexposeed photopolymerizable material. The color, while giving a good readable image, was slightly lower in image density than the density of the transferred image in Example I. There was no background stain.

Example IV

A polymeric dye was made by pouring into a 250 gram aqueous solution containing 0.5 gram of the monomolecular dye disclosed in Example III and 25 grams of sodium sulfate, a 250 ml. aqueous solution containing 10 grams of methyl cellulose (containing ca. 28–30% methoxyl and having a viscosity in a 2% aqueous solution at 20° C. of 50 cps.). This mixture was heated to 50° C. and stirred for 20 minutes. There was then added 6.25 grams of $Na_3PO_4 \cdot 12H_2O$ and heated to 70° C. and stirred for 30 minutes during which time the polymeric ether dye precipitated out of solution. The precipitated polymeric dye was filtered and washed with 1500 ml. of a cold aqueous solution containing 75 grams of sodium sulfate and then with 1000 ml. of a boiling aqueous solution containing 50 grams of sodium sulfate. The washed precipitate was dried in a vacuum oven for 48 hours to give a dried weight of 2.92 grams of the polymeric dye.

A photopolymerizable composition was prepared by first mixing in a liquid blending mixer, 500 g. of a methylene chloride solution containing 50 grams of the cellulose acetate butyrate described in Example II. Then 0.5 gram of the above polymeric dye, 1.1 grams of the 10% polyethylene oxide solution disclosed in Example I and 4 grams of methyl alcohol were mixed and stirred for 15 minutes. To this latter dye solution there was added 3.2 grams of pentaerythritol triacrylate, 12.0 grams of the above cellulose acetate butyrate solution, 0.04 gram of phenanthrenequinone and 8 grams of methylene chloride and 26 grams of acetone. The mixture was stirred for one hour and then coated on one mil polyethylene terephthalate film. After drying for about 30 minutes, a cover film of one mil polyethylene terephthalate was pressure laminated to the surface of the photopolymerizable stratum in the manner taught by assignee's Heiart U.S. Patent 3,060,026.

The resulting element was exposed, the cover film stripped off and the unexposed areas transferred to a receptive sheet in the manner described in Example III. The transferred image clear, sharp copy showing no evidence of background stain. The top density was 0.48 and the transferred image showed excellent contrast.

Example V

A polymeric dye was made by pouring into a 250 grams aqueous solution heated to 50° C. and containing 0.5 gram of the dye of Example III and 25 grams of sodium sulfate, a 200 grams acetone solution containing 10 grams of ethyl cellulose (containing 45.0–46.5% ethoxyl and having a viscosity of 10 centipoises in a 5% solution 60–40 toluene-ethanol at 25° C.). The solution was stirred during the mixing operation. The polymeric dye precipitated and the acetone was removed by heating the mixture to 100° C. first on a steam bath and then on a hot plate. The reaction mixture was cooled to 60° C. and 6.25 grams of tribasic sodium phosphate, $Na_3PO_4 \cdot 12H_2O$ was added. The solution was heated to 70° C. and stirred for 20 minutes. It was then filtered and the precipitate washed with one liter of cold water and then one liter of boiling water. The polymeric ether dye was then dried overnight in a vacuum oven.

A photopolymerizable composition was made by mixing together 0.5 gram of the above dye, 3.2 grams of pentaerythritol triacrylate, 1.1 grams of the polyethylene oxide solution described in Example I, 12 grams of the cellulose acetate butyrate solution of Example III, 0.04 gram of phenanthrenequinone and 20 grams of acetone. The mixture was stirred for one hour and then coated on one-mil polyethylene terephthalate film to a wet coated thickness of 6 mils. A cover sheet was laminated thereon and the element exposed and processed in the manner set forth in Example II. A clear image was transferred to a receptor sheet which showed good contrast and a background free of stain although the maximum image density was slightly lower than those obtained in Example IV.

Example VI

A polymeric dye was made by adding 115 grams of a 10% solution of the cellulose acetate butyrate defined in Example III to a 250 gram aqueous solution containing 25 grams of sodium sulfate and 1 gram of the dye disclosed in Example III. The mixture was heated to 100° C. to remove the acetone and then cooled to 50° C. At this point, 6.25 grams of tribasic sodium phosphate, $Na_3PO_4 \cdot 12H_2O$, was added and the resulting solution was stirred for two hours. The polymeric ether dye precipitated and was washed in cold and boiling water until the filtrate was no longer colored. The resulting dye was dried for 18 hours under vacuum at 105° C.

A photopolymerizable composition was made by mixing 30 grams of a solution of 11.52 grams of the above dye dissolved in 115 grams of acetone, 2.8 grams of the polyethylene oxide solution of Example III, 7.0 grams of pentaerythritol triacrylate, 0.10 gram of phenanthrenequinone, and 50 grams of acetone. The mixture was stirred for one hour and then coated on a one-mil polyethylene terephthalate film and laminated in the manner described in Example III. After exposing, processing and transferring the unphotopolymerized image as described in Example III a clear copy showing no evidence of background stain was obtained. The maximum density of the transferred images was only slightly less than those obtained in Example IV.

Example VII

A polymeric dye was made by adding 400 grams of an aqeuous solution containing 50 grams of the polyethyleneimine described in Example I to 1000 grams of an aqueous solution containing 50 grams of the monomolecular dye described in Example I. The mixture was heated to 80° C. in a water jacket with stirring. The mixture was then heated in a steam bath for 15 minutes and then chilled in an ice bath. There was then added 90 grams of glacial acetic acid. The solvent was removed and the precipitated polymeric dye was dried at 50° C. in a vacuum oven for 18 hours and a polymeric amine dye was obtained.

A photopolymerizable composition was prepared by mixing together 5.0 g. of ethylene glycol monomethyl ether, 5.0 g. of ethyl alcohol, 0.9 g. of the polyethylene oxide solution shown in Example I, and 0.40 gram of the above polymeric dye. The mixture was brought to a boil and stirred for 30 minutes while allowing the mixture to cool. There was then added to the mixture, 3.1 grams of pentaerythritol triacrylate, 6.0 grams of the 10% solution of cellulose acetate butyrate described in Example I, 0.04 gram of phenanthrenequinone and 25 grams of methylene chloride. The mixture was stirred for one hour and then coated on one-mil polyethylene terephthalate to a wet coating thickness of 6 mils and dried. A one-mil polyethylene terephthalate was then laminated to the surface of the dried photopolymerizable stratum.

The photopolymerizable element was exposed, stripped and the area corresponding to the unpolymerized area was transferred in the manner described in the previous examples. The transferred image showed excellent quality, good maximum density and virtually no background stain.

Example VIII

A polymeric dye was prepared by refluxing with stirring for 3 hours, 45 grams of anhydrous polyethyleneimine having a molecular weight of about 35,000, 356 grams of methoxypolyethylene glycol hydrogen succinate of average molecular weight about 850 (made by reacting methoxypolyethylene glycol of an average weight of 750 with succinic anhydride); 140 grams of the dye of Example I and 2000 g. of methylene chloride. The polymeric amine dye was filtered to remove insoluble impurities and the dye filtrate was made up to 3000 grams with methylene chloride.

A photopolymerizable composition was prepared by mixing with warming for at least one hour, 895 grams of pentaerythritol triacrylate, 4350 grams of a methylene chloride solution containing 226 grams of cellulose acetate butyrate (ca. 20.5% acetyl, ca. 26% butyryl groups) and having a viscosity of 9.0–13.5 determined as described in Example I, 156 grams of cellulose acetate having an acetyl content of 39.4% and having a viscosity of 147–197 poises as determined by ASTM method D–1343–56 in the solution described as Formula A, ASTM D–871–56, 2000 grams of the above polymeric dye solution, 62.5 grams of Castorwax, 13.0 grams of phenanthrenequinone and 12,000 grams of methylene chloride.

The resulting solution was extrusion coated on 0.8-mil polypropylene film support to give a dry thickness of about 0.4 mil. The coated layer was overcoated with an oxygen barrier stratum of wax as described in Example I.

The resulting dried coating was exposed and transferred as described in Example I to give a reproduction having excellent legibility and freedom from background stain. The image had a maximum density of 0.76.

Example IX

A polymeric dye was prepared by refluxing with stirring for three hours, 200 grams of the yellow dye having the formula:

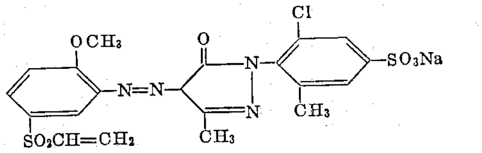

256 grams of methoxypolyethylene glycol hydrogen succinate of average molecular weight about 850 (made by reacting methoxypolyethylene glycol of an average weight of 750 with succinic anhydride); 45 grams of polyethyleneimine having a molecular weight of about 35,000 and 2,000 grams of methylene chloride. The polymeric amine dye was filtered to remove any impurities and the yellow dye filtrate made up to 3000 grams with methylene chloride.

A photopolymerizable composition was prepared by mixing with warming for at least one hour 200 grams of the dye solution of Example III, 100 grams of the above yellow dye solution, 178 grams of pentaerythritol triacrylate, 870 grams of a methylene chloride solution containing 77 grams of the cellulose acetate butyrate described in Example VIII, 12.6 grams of Castorwax and 50 grams of a methanol solution containing 0.5 gram of Safranine T, and 10 grams of triethanolamine. The resulting composition was coated and overcoated with a wax mixture as described in Example VIII.

Upon exposure and thermal transfer as described above, good copies were obtained which were very legible and neutral grey in color. There was no evidence of background stain and the maximum density was 0.60.

Example X

A polymeric dye was prepared by mixing 10 grams of a 50% aqueous solution of the polyethyleneimine of Example I with a 5% aqueous solution of an anthraquinone dye having the following general formula:

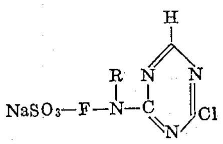

where F is an anthraquinone nucleus and R has the meaning assigned above. The monomolecular fiber-reactive dye is designated as C.I. Reactive Blue 5 as set forth in Colour Index—Supplement 1963, Colour Index, 2nd ed., 1956, published by The Society of Dryers and Colourists, Bradford, Yorkshire, England. The mixture was heated to 80° C. and placed in a steam bath for 20 minutes and then to 30° C. and the pH was adjusted to 4.6 with acetic acid. The reaction mixture was evaporated to dryness and the polymeric amine dye precipitate was dried overnight at 50° C.

A photopolymerizable composition was prepared by mixing 6.0 g. of ethyl alcohol, 6.0 g. of ethylene glycol monomethyl ether and 0.6 g. of the above dye. The mixture was brought to a boil and then cooled for 30 minutes with vigorous stirring. To this mixture, there was then added 3.6 grams of pentaerythritol triacrylate, 6.2 grams of a 15% solution of the cellulose acetate butyrate described in Example III, 0.04 gram of phenanthrenequinone, 1.1 grams of the polyethylene oxide solution described in the previous examples and 28 grams of methylene chloride. The mixture was thoroughly stirred and then coated on one-mil polyethylene terephthalate film. The surface of the photopolymerizable stratum was pressure laminated with a sheet of one-mil polyethylene terephthalate film.

Upon exposure, stripping of the cover sheet and transferring as described above it was found that the transferred image was of very high quality. There was virtually no background stain thus providing a high contrast image. The maximum density was 0.55.

Example XI

A polymeric dye was prepared by mixing together in 700 grams of methylene chloride, 10 grams of anhydrous polyethyleneimine, 20 grams of sodium carbonate and 45 grams of the fiber-reactive monomolecular dye having the formula:

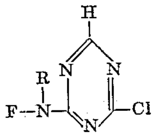

where F is an anthraquinone nucleus and R has the meaning assigned above. The monomolecular dye is designated as C.I. Reactive Blue 6 in the Colour Index designated in Example X. The mixture was refluxed with stirring for 6 hours and allowed to stand for 60 hours at room temperature. There was then added 30 grams of methoxypolyethylene glycol succinate of molecular weight about 350 and the mixture was stirred for 30 minutes and then allowed to stand for 30 minutes. The resulting mixture was filtered through nainsook and then centrifuged for 10 minutes to remove any unreacted insoluble material from the polymeric amine dye solution.

A photopolymerizable composition was prepared by mixing 2.8 grams of pentaerythritol triacrylate, 9.0 grams of a 10% methylene chloride solution of the cellulose acetate butyrate disclosed in Example III, 3 grams ethylene glycol monomethyl ether, one gram of the polyethylene oxide solution described in Example I, 9.0 grams of the polymeric dye filtrate described above, 0.1 gram of glacial acetic acid, 0.04 gram of phenanthrenequinone and 25 grams of methylene chloride. The mixture was stirred for one hour and then coated on one-mil polyethylene terephthalate film and allowed to dry for one hour to give a dried layer having a thickness of approximately 1.3 mils. A one-mil polyethylene terephthalate sheet was pressure laminated to the surface of the photopolymerizable stratum.

After exposure, stripping and transfer as described above it was found that the transferred image had excellent quality with no evidence of background stain thus providing good contrast.

Suitable thermoplastic polymers for use as components (a) include:

(A) Copolyesters, e.g., those prepared from the reaction product of a polymethylene glycol of the formula $HO(CH_2)_nOH$, wherein $n$ is a whole number 2 to 10 inclusive, and (1) hexahydroterphthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids.

(B) Polyamides, e.g., N-methoxymethyl polyhexamethylene adipamide;

(C) Vinylidene chloride copolymers, e.g., vinylidene chloride/acrylonitrile; vinylidene chloride/methylacrylate and vinylidene chloride/vinylactate copolymers;

(D) Ethylene/vinyl acetate copolymers;

(E) Cellulosic ethers, e.g., methyl cellulose, ethyl cellulose and benzyl cellulose;

(F) Polyethylene;

(G) Synthetic rubbers, e.g., butadiene/acrylonitrile copolymers, and chloro-2-butadiene-1,3 polymers;

(H) Cellulose esters, e.g., cellulose acetate, cellulose acetate succinate and cellulose acetate butyrate;

(I) Polyvinyl esters, e.g., polyvinyl acetate/acrylate, polyvinyl acetate/methacrylate and polyvinyl acetate;

(J) Polyacrylate and alpha-alkyl polyacrylate esters, e.g., polymethyl methacrylate and polyethyl methacrylate;

(K) High molecular weight polyethylene oxides of polyglycols having average molecular weights from about 4,000 to 1,000,000;

(L) Polyvinyl chloride and copolymers, e.g., polyvinyl chloride/acetate;

(M) Polyvinyl acetal, e.g. polyvinyl butyral, polyvinyl formal;

(N) Polyformaldehydes;

(O) Polyurethanes;

(P) Polystyrenes

To the thermoplastic polymer constituent of the photopolymerizable composition there can be added non-thermoplastic polymeric compounds to give certain desirable characteristics, e.g., to improve adhesion to the base support, adhesion to the receptor support on transfer, wear properties, chemical inertness, etc. Suitable non-thermoplastic polymeric compounds include polyvinyl alcohol, cellulose, anhydrous gelatin, phenolic resins and melamine-formaldehyde resins, etc. If desired, the photopolymerizable layers can also contain immiscible polymeric or non-polymeric organic or inorganic fillers or reinforcing agents which are essentially transparent at the wave lengths used for the exposure of the photopolymeric material, e.g., the organophilic silica, bentonites, silica, powdered glass, in amounts varying with the desired properties of the photopolymerizable layer. The fillers are useful in improving the strength of the composition, reducing tack.

Suitable addition polymerizable ethylenically unsaturated compounds for use as components (b) which can be used with the above-described thermoplastic polymer compounds includes in addition to the pentaerythritol triacrylate of the examples, other pentaerythritol derivatives as disclosed in assignee's Celeste et al. U.S. application Ser. No. 274,909, filed Apr. 23, 1963, unsaturated esters of polyols, particularly such esters of the alpha-methylene carboxylic acids, e.g., ethylene glycol diacrylate, diethylene glycol diacrylate, glycerol diacrylate, glycerol triacrylate, ethylene glycol dimethacrylate, 1,3-propanediol dimethacrylate 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, the bis-acrylates and methacrylates of polyethylene glycols of molecular weight 200–500, and the like; unsaturated amides, particularly those of the alpha-methylene carboxylic acids, and especially those of alpha-omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis (gamma-methacrylamidopropoxy)ethane, betamethacrylamido-ethyl methacrylate, N-(beta-hydroxyethyl)-beta-(methacrylamido)ethyl acrylate and N,N - bis(beta-methacrylyloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes, such as sorbaldehyde (hexadienal). An outstanding class of these preferred addition polymerizable components are the esters and amides of aplha-methylene carboxylic acids and substituted carboxylic acids with polyols and polyamines wherein the molecular chain between the hydroxyls and amino groups is solely carbon or oxygen-interrupted carbon. The preferred monomeric compounds are multifunctional, but monofunctional monomers can also be used. The amount of monomer added varies with the particular thermoplastic polymer used.

A preferred class of addition polymerization initiators (c) activatable by actinic light and thermally inactive at and below 185° C. includes the substituted or unsubstituted polynuclear quinones which are compounds having two intracyclic carbonyl groups attached to intracyclic carbon atoms in a conjugated six-membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2-tert. - butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3 - dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10 - tetrahydronaphthacenequinone, and 1,2,3,4-tetrahydrobenzene(a)anthracene-7,12-dione. Other photoinitiators which are also useful are described in Plambeck U.S. Patent 2,760,863 and include vicinal ketaldonyl compounds, such as diacetyl, benzil, etc.; α-ketaldonyl alcohols, such as benzoin, pivalon, etc.; acyloin ethers, e.g., benzoin methyl and ethyl ethers, etc.; α-hydrocarbon substituted aromatic acyloins, including α-methylbenzoin, α-allylbenzoin, and α-phenylbenzoin.

Suitable thermal polymerization inhibitors (d) that can be used in addition to the preferred p-methoxyphenol include hydroquinone, and alkyl and aryl-substituted hydroquinones and quinones, tert.-butylcatechol, pyrogallol, copper resinate, naphthylamines, beta-naphthol, cuprous chloride, 2,6-di-tert-butyl p-cresol, phenothiazine pyridine, nitrobenzene and dinitrobenzene. Other useful inhibitors include p-toluquinone and chloranil.

The photopolymerizable composition containing the polymeric dye is coated on any suitable support. Suitable support materials must be stable at the heating temperatures used in the instant invention. Suitable bases or supports include in addition to the polyethylene terephthalate of the examples, those disclosed in U.S. Patent 2,760,863, glass, wood, paper, cloth, cellulose esters, e.g., cellulose acetate, cellulose propionate, cellulose butyrate, etc., polyolefins and other plastic compositions, etc. The support may have in or on its surface and beneath the photopolymerizable stratum an antihalation layer as disclosed in said patent or other substrata needed to facilitate anchorage to the base and also coatings on the back of the support.

The receptor support to which the image is transferred must also be stable at the process temperatures. The particular support used is dependent on the desired use for the transferred image and on the adhesion of the image to the base. Suitable receptors, in addition to bond paper, may be resin and clay sized paper, resin coated or impregnated paper, cardboard, metal sheets, foils and meshes e.g., aluminum, copper, steel, bronze, etc., wood, glass, nylon, rubber, polyethylene, linear condensation polymers such as the polyesters, e.g., polyethylene terephthalate, regenerated cellulose, cellulose esters e.g., cellulose acetate, silk, cotton, and viscous rayon fabrics or screens.

As previously mentioned, the receptive support may have a hydrophilic surface or may contain on its surface chemical compounds which react with compounds being transferred so as to produce differences in color, hydrophilicity or conductivity between the exposed and underexposed or unexposed areas or for improved adhesion or brightening of the receptive support. The receptor surface may be smooth, contain roughening agents such as silica, be perforated or be in the form of a mesh or screen.

The elements of the present invention are useful for a variety of copying, printing, decorative and manufacturing operations. It will be readily understood that as a result of the exposure and transfer operations described in the examples, the operator forms simultaneously a positive copy of the original image on the receptor sheet and a negative copy on the original support, both of which are quite useful in photomechanical printing operations. Where the reversed image on the original support is to be utilized, any of the non-transferred unpolymerized material can be completely removed by a liquid which is a solvent for the unpolymerized but not for the polymerized material which was affected by actinic radiation. This leaves a highly colored reversed copy of the original which is free of background stain. Multicopies of the duplicate copy can also be made which are free of background strain by bringing into intimate contact the surface of the exposed photopolymerizable element and the surface of the receptor sheet and applying heat. The heat transfer method is useful in making office copy and also for decorative effects. It is also quite useful in silk screen processes. A further application is in the preparation of multicolor prints which can be made by virtue of the fact that different colored monomolecular dyes having the above reactive groups can be reacted with the appropriate polymers to form polymeric dyes. The dyes can be incorporated into the photopolymerizable system and when differently colored images are transferred in succession, colored images may be formed which have a minimum of background stain and have good fade-resistant qualities.

The instant invention has the advantage that by an inexpensive, quick, simple procedure, involving the use of heat and light in a dry system, positive and/of negative images can be produced, said images being free of unwanted background stain and having high contrast and fidelity. The invention also has the advantage of eliminating the undesirable long "toe" of the sensitometric density response curve. The absence of a low-contrast "toe" region means that high contrast copies can be obtained from low contrast originals. Still additional advantages will be apparent from the foregoing description to those skilled in the art.

I claim:

1. A photopolymerizable element comprising a support bearing a thermoplastic photopolymerizable stratum, said stratum being solid below 40° C., thermally transferable by having a stick or transfer temperature above 18° C. and below 220° C. and comprising:

(a) a thermoplastic organic compound solid at 50° C.,
(b) an ethylenically unsaturated compound containing at least one terminal $CH_2$=C< group, having a boiling point above 100° C. at normal atmospheric pressure and being capable of forming a high polymer by photoinitiated addition by polymerization,
(c) a free radical generating addition polymerization initiator activatable by actinic light in the visible region of the spectrum and inactive thermally below 85° C., and
(d) a polymeric dye having recurring extralinear dye nuclei and a molecular weight of at least 10,000, said polymeric dye being a light-fast polymeric ester, ether, amine or amide and being the reaction product of (*a*) a polymer having in recurring units reactive —OH, $NH_2$ or >NH groups with (B) a monomolecular dye of the formula F—Y where F is a fiber-reactive dye moiety containing light-absorbing units and Y is a fiber-reactive group which reacts with said polymer reactive group, said fiber reactive group being a member selected from the class consisting of —$SO_2F$, —$SO_2Cl$, —COCl, —$SO_2$—CH=$CH_2$,

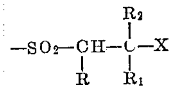

where X is Cl or Br and R, $R_1$ and $R_2$ are H, methyl, ethyl, propyl or butyl, —$NHCOCH_2CH_2Cl$,

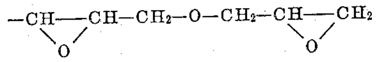

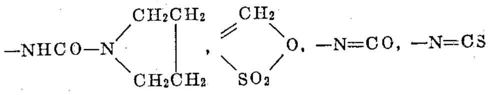

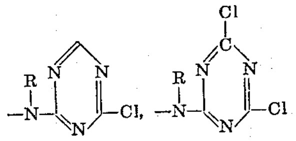

and

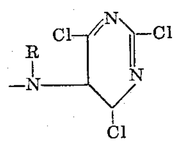

where R is hydrogen or low molecular weight hydrocarbon, said dye having an extinction coefficient greater than 1000, absorbing actinic radiation in a portion of the visible spectrum and not absorbing appreciable actinic radiation in another region where said initiator is activatable.

2. An element according to claim 1 where components (a) and (b) are present in the respective parts by weight 3 to 97 and 97 to 3.

3. An element according to claim 1 containing at least one of the following components:

(e) an addition polymerization inhibitor, and
(f) a chain transfer agent.

4. An element according to claim 1 wherein the support is a thin transparent hydrophobic polymer film.

5. An element according to claim 1 where the dye is a polymeric amine having intralinear imine linkages and extralinear dye nuclei attached to the intralinear nitrogen atoms.

6. An element according to claim 1 wherein the dye is a cellulose derivative having dye nuclei linked to the cellulose chain through an ether group.

7. A process for transferring underexposed photographic images from a stratum on a support to a receptive surface on a separate support, said stratum being solid below 40° C. and containing (1) underexposed image areas that are thermally transferable by having a stick or transfer temperature between 18° C. and 220° C., comprising (a) a thermoplastic organic compound solid at 50° C., (b) an ethylenically unsaturated compound containing at least one terminal $CH_2{=}C<$ group, having a boiling point above 100° C. at normal atmospheric pressure and being capable of forming a high polymer by photoinitiated addition polymerization, (c) a free radical generating addition polymerization initiator activatable by actinic light in the visible region of the spectrum and inactive thermally below 85° C., and (d) a polymeric dye having recurring extralinear dye nuclei and a molecular weight of at least 10,000, said polymeric dye being a light-fast polymeric ester, ether, amine, or amide and being the reaction product of (A) a polymer having in recurring units reactive —OH, $NH_2$, or >NH groups with (B) a monomolecular dye of the formula F—Y where F is a fiber-reactive dye moiety containing light-absorbing units and Y is a fiber-reactive group which reacts with said polymer reactive group, said fiber-reactive group being a member selected from the class consisting of $—SO_2F$, $—SO_2Cl$, —COCl, $—SO_2—CH{=}CH_2$,

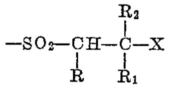

where X is Cl or Br and R, $R_1$ and $R_2$ are H, methyl, ethyl, propyl or butyl, $—NHCOCH_2CH_2Cl$

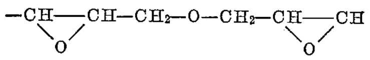

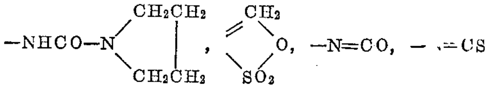

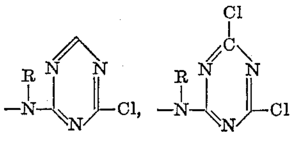

and

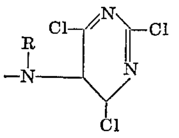

where R is hydrogen or low molecular weight hydrocarbon, said dye having an extinction coefficient greater than 1000, absorbing actinic radiation in a portion of the visible spectrum and not absorbing appreciable actinic radiation in another region where said initiator is activatable, and (2) exposed complementary adjoining image areas that are solid at 50° C., non-thermally transferable at said stick or transfer temperature at which the underexposed areas are thermally transferable, and comprising an addition polymer of component (b) and components (c) and (d); said process comprising:

(A) placing the outer surface of said stratum into contact with said receptive surface;

(B) heating at least one of the supports to a temperature of at least 40° C. but less than the melting point of the complementary image areas while the stratum is in contact with the receptive surface to selectively soften the underexposed image areas; and (C) separating the receptive surface from the stratum whereby underexposed image areas of said stratum are transferred onto said surface.

8. A process according to claim 7 wherein components (a) and (b) are present in the responsive parts, by weight, 3–97 and 97–3.

9. A process according to claim 7 wherein the original stratum contains at least one of the following components:

(e) an addition polymerization inhibitor, and (f) a chain transfer agent.

10. A process according to claim 7 wherein the support is a thin transparent hydrophobic film and the receptive surface is paper.

11. A process according to claim 7 wherein the dye is a polymeric amine having intralinear imine linkages and extralinear dye nuclei attached to the intralinear nitrogen atoms.

12. A process according to claim 7 wherein the dye is a cellulose derivative having extralinear dye nuclei linked to the cellulose chain through an ether group.

References Cited

UNITED STATES PATENTS

| | | | |
|---|---|---|---|
| 3,070,442 | 12/1962 | Cohen et al. | 96—115 |
| 3,073,699 | 1/1963 | Firestine | 96—115 |
| 3,198,633 | 8/1965 | Cohen et al. | 96—115 |

NORMAN G. TORCHIN, *Primary Examiner.*

R. C. MARTIN, J. H. RAUBITSCHEK, *Assistant Examiners.*